United States Patent
Ries et al.

(10) Patent No.: US 8,177,686 B2
(45) Date of Patent: May 15, 2012

(54) TRANSMISSION TORQUE CONVERTER CLUTCH CONTROL

(75) Inventors: Scott P. Ries, South Lyon, MI (US); Brian M. O'Neil, Ann Arbor, MI (US); Bradley D. Riedle, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 383 days.

(21) Appl. No.: 12/686,576

(22) Filed: Jan. 13, 2010

(65) Prior Publication Data
US 2011/0172056 A1 Jul. 14, 2011

(51) Int. Cl.
*F16H 61/14* (2006.01)
(52) U.S. Cl. ........................... 477/168; 477/176
(58) Field of Classification Search .................. 477/168, 477/176; 192/3.31
See application file for complete search history.

(56) References Cited

U.S. PATENT DOCUMENTS

| | | | |
|---|---|---|---|
| 3,656,372 A | | 4/1972 | Chana |
| 5,535,863 A | * | 7/1996 | Vukovich et al. ............. 192/3.3 |
| 5,722,912 A | | 3/1998 | Narita |
| 5,807,209 A | * | 9/1998 | Matsubara et al. ........... 477/176 |
| 6,139,472 A | * | 10/2000 | Harada et al. ................. 477/169 |
| 6,338,696 B1 | | 1/2002 | Sakakibara et al. |
| 6,565,483 B2 | * | 5/2003 | Segawa et al. ................ 477/174 |
| 6,780,141 B1 | * | 8/2004 | Kao et al. ...................... 477/164 |
| 7,195,581 B2 | | 3/2007 | Segawa et al. |
| 7,305,300 B2 | | 12/2007 | Gibson et al. |
| 7,361,120 B2 | | 4/2008 | Iida et al. |
| 7,425,187 B2 | | 9/2008 | Doering |
| 7,473,209 B2 | | 1/2009 | Todd et al. |
| 2007/0287569 A1 | | 12/2007 | Miah |
| 2007/0295548 A1 | | 12/2007 | Boctor et al. |
| 2008/0058160 A1 | * | 3/2008 | Kluemper et al. ............ 477/168 |

* cited by examiner

*Primary Examiner* — Sherry Estremsky
(74) *Attorney, Agent, or Firm* — David B. Kelley, Esq.; MacMillan, Sobanski & Todd, LLC

(57) ABSTRACT

A method for controlling a vehicle torque converter lockup clutch during a deceleration coasting event includes producing slip across the clutch by reducing the clutch's torque capacity, decreasing said slip by increasing said torque capacity, and maintaining slip across the clutch.

13 Claims, 2 Drawing Sheets

TRANSMISSION TORQUE CONVERTER CLUTCH CONTROL

BACKGROUND OF THE INVENTION

1. Field of the Invention

This invention relates generally to control of a motor vehicle torque converter clutch during negative torque coast downs to avoid lash and clunk.

2. Description of the Prior Art

During an aggressive deceleration fuel shutoff (ADFSO) coasting event of a vehicle equipped with an automatic transmission, when its torque converter clutch transitions from hard lock, i.e., with zero slip, to a controlled negative slip, preferably about negative 40 rpm, unlocking the converter clutch can cause fuel supply to the engine to resume. This is primarily due to a "stick-slip" phenomenon wherein the dynamic coefficient of friction of the clutch in its slipping state differs from the static coefficient of friction in its locked state.

Due to the stick-slip occurrence, the torque transmitting capacity of the torque converter clutch must be substantially decreased to generate slip and then increased soon thereafter to maintain a controlled amount of negative slip. If the clutch actuating hydraulic pressure doesn't increase fast enough, then destroking the clutch causes the fuel injectors to pump fuel into the engine cylinders. If clutch actuating pressure increases too fast, then the clutch torque capacity is too large, reducing slip across the clutch causing a bump that can be felt by vehicle occupants. Destroking the clutch causes a loss of fuel economy and the related bump is attributed to harsh gear shifting of the transmission.

Different vehicles begin generating negative converter clutch slip at different clutch actuation pressures due to variability in transmission hardware, braking rate, and engine torque differences.

A need exists in the industry for a technique during a deceleration fuel shutoff coasting event to increase slip across the torque converter clutch before it decreases too far and to increase its torque capacity smoothly without causing destroke or bumps.

SUMMARY OF THE INVENTION

A method for controlling a vehicle torque converter lockup clutch during a deceleration coasting event includes producing slip across the clutch by reducing the clutch's torque capacity, decreasing the magnitude of negative clutch slip by increasing said torque capacity, and maintaining slip across the clutch.

The method provides a consistent, acceptable control of the converter clutch during a deceleration coasting event without unlocking the torque converter, which produces a reduction in fuel economy. The method avoids a harsh bump that resulted from prior control method.

Clutch slip reliably indicates that torque capacity of the converter clutch has decreased sufficiently before beginning the catch mode torque capacity increase.

The increase in clutch torque capacity in the "catch mode" can account for the different clutch braking rates and hardware variables that occur across a range of converter clutches to which the algorithm is applied.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
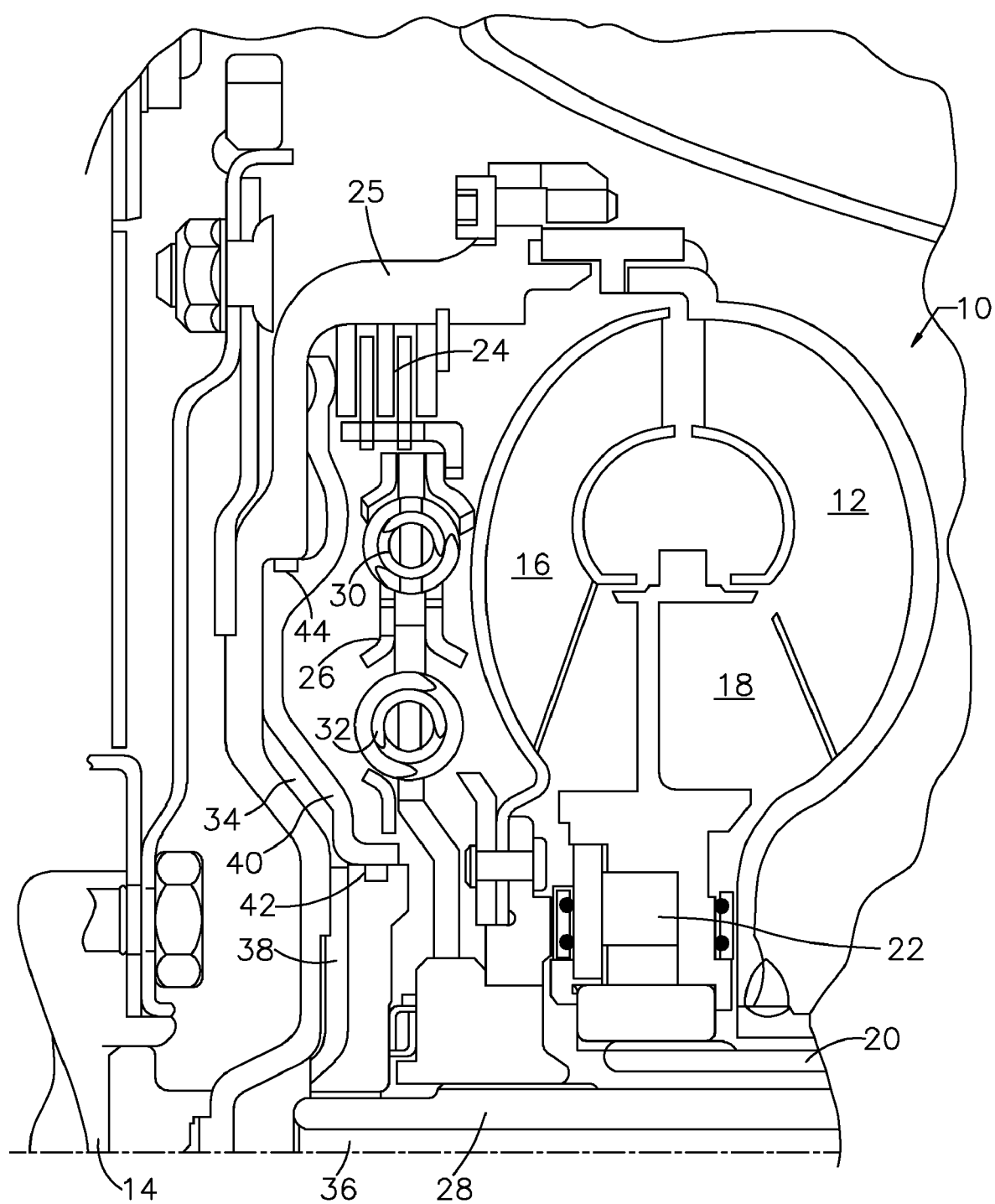
FIG. 1 is a cross section of a torque converter to which the control strategy can be applied.

Referring first to FIG. 1, a torque converter 10 includes a bladed impeller wheel 12 connected to the crankshaft 14 of an internal combustion engine, a bladed turbine wheel 16, and a bladed stator wheel 18. The impeller, stator and turbine wheels define a toroidal fluid flow circuit, whereby the impeller is hydrokinetically connected to the turbine. The stator 18 is supported rotatably on a stationary stator sleeve shaft 20, and an overrunning brake 22 anchors the stator to shaft 20, thereby preventing rotation of the stator in a direction opposite the direction of rotation of the impeller, although freewheeling motion in the opposite direction is permitted.

The torque converter assembly 10 includes a lockup clutch 24 located within a torque converter housing 25, which is secured to the impeller 12. The lockup clutch 24 alternately engages and disengages a drive connection between the housing 25 and a damper 26. The damper 26 is located in a torque path between clutch 24 and a turbine shaft, which is the transmission input shaft 28. The damper 26 may incorporate dual or single-stage compression springs 30, 32.

When clutch 24 is fully engaged or slipping, i.e., while there is a speed difference between its input and output, damper 26 attenuates transitory torque fluctuations between the engine crankshaft 14 and input shaft 28. When the clutch is disengaged, the hydrokinetic connection between the impeller 16 and turbine 16 mitigates transient torque disturbances.

The clutch 24 is alternately engaged and disengaged in accordance with the magnitude of clutch apply pressure communicated to a hydraulic cylinder 34 through an axial passage 36 formed in the input shaft 28 and a radial passage 38. A closed piston 40, sealed on housing 25 by O-rings 42, 44, moves rightward within the cylinder to force the discs of clutch 24 into mutual frictional contact, and leftward to allow the discs to disengage mutually.

When clutch 24 is engaged, the turbine and impeller are mechanically connected and hydrokinetically disconnected; when clutch 24 is disengaged, the turbine and impeller are hydrokinetically connected and mechanically disconnected. Fluid contained in the torque converter 10 is supplied from the output of an oil pump and is returned to an oil sump, to which an inlet of the pump is connected hydraulically.

Figure 2:
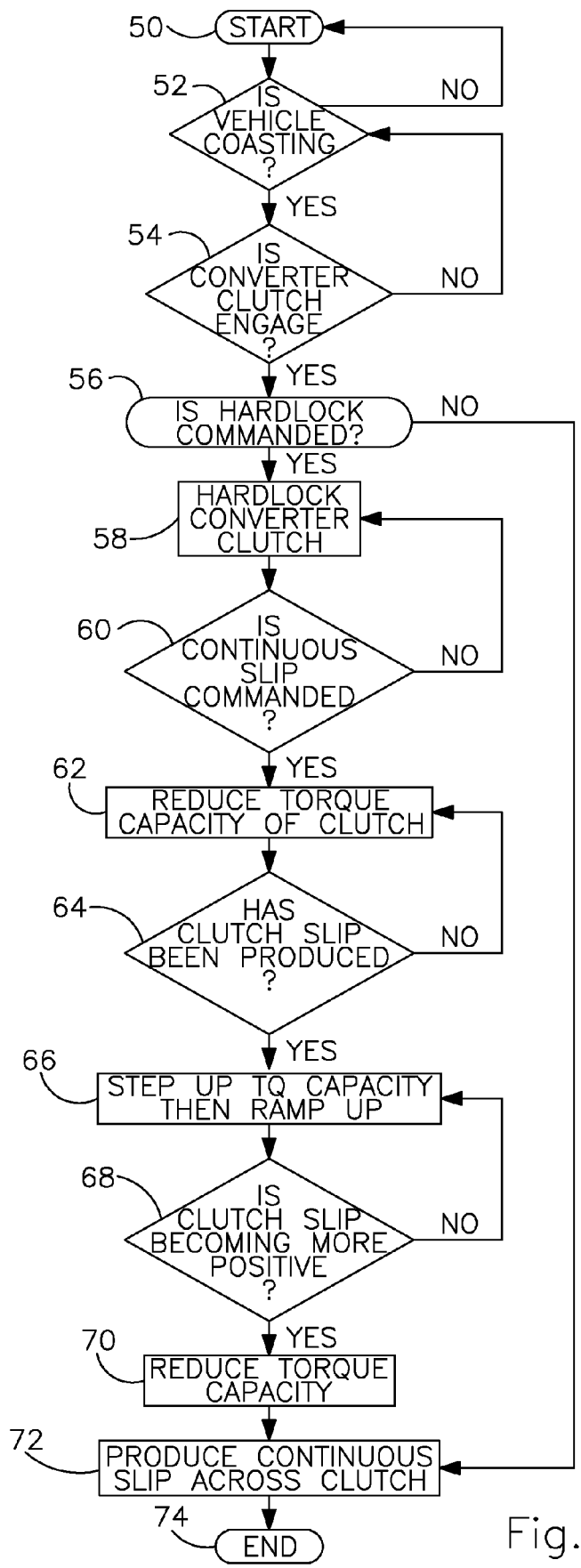
FIG. 2 illustrates an algorithm for controlling the torque converter lockup clutch during a deceleration fuel shutoff coasting event.

FIG. 2 illustrates an algorithm for controlling the lockup clutch 24 during a deceleration, negative torque, coasting event, in which torque is transmitted from the wheels of a motor vehicle to its engine through the lockup clutch of an automatic transmission.

After execution of the algorithm begins at step 50, a test is made at step 52 to determine whether the vehicle is coasting, i.e., moving with the accelerator pedal fully released, the engine running, the wheels transmitting torque to the engine through the lockup clutch. Preferably the engine throttle is closed or substantially closed.

If the result of test 52 is logically false, control returns to step 50. If the result of test 52 is logically true, control advances to step 54 where a test is made to determine whether the converter lockup clutch 24 is engaged, i.e., applied.

If the result of test 54 is false, control returns to step 52. If the result of test 54 is true, control advances to step 56 where a test is made to determine whether the electronic controller, which is controlling lockup clutch 24, has commanded that the clutch be fully engaged or hard-locked.

If the result of test 56 is false, control advances to step 72 where the controller adjusts the torque capacity of clutch 24 such that slip across the clutch continuously slips. Execution of the algorithm ends at step 74.

If the result of test 56 is true, clutch 24 is hard locked at step 58 by increasing the clutch actuating pressure in volume 34.

At step 60 a test is made to determine whether the controller has commanded that the lockup clutch 24 be slipping. If the result of test 60 is false, control returns to step 58.

If the result of test 60 is true, at step 62 the torque transmitting capacity of clutch 24 is reduced at step 62 decreasing the actuating pressure in volume 34. Preferably the torque capacity is reduced first by a step function and then gradually by reducing pressure in volume 34 linearly with time or along a descending nonlinear ramp.

At step 64 a test is made to determine whether slip across clutch 24 has been produced, thereby indicating that the clutch is disengaging. Preferably, clutch slip produced at step 64 should be sufficient to overcome noise in electronic signals produced by sensors whose output represents the rotational speed on opposite sides of clutch 24. If the result of test 64 is false, control control returns to step 62.

If the result of test 64 is true, the torque transmitting capacity of clutch 24 is increased at step 66 by increasing the actuating pressure in volume 34. Preferably the torque capacity is increased at step 66 first by a step function and then linearly or along an ascending ramp that increases with time. As step 66 is performed, torque capacity of clutch 24 continues to ramp up slowly, thereby increasing torque capacity enough to slow the rate of change of slip and preventing the converter from destroking. Preferably the "catch" mode step 66 does not entirely eliminate slip across clutch 24.

At step 68, a test is made to determine whether the magnitude of slip across clutch 24 is more positive than the clutch slip that occurred at a previous loop or execution of the algorithm, or another loop before the last loop. If the result of test 68 is false, control returns to step 66.

If the result of test 68 is true, indicating that clutch slip is becoming more positive, at step 70 the torque capacity of clutch 24 is reduced slightly by decreasing the actuating pressure in volume 34, preferably producing a low magnitude stepwise reduction in torque capacity, which ensures that clutch slip occurs continuously at step 72. This final step down in clutch torque capacity keeps the converter clutch slipping smoothly in the negative domain in a controlled fashion.

Preferably the increase in clutch torque capacity or "catch mode," which is initiated at step 66 in response to slip across clutch 24, accounts for the different clutch braking rates and hardware variables that occur across a range of converter clutches to which the algorithm is applied. Clutch slip reliably indicates that torque capacity of the converter clutch 24 has decreased sufficiently before beginning the catch mode torque capacity increase.

In accordance with the provisions of the patent statutes, the preferred embodiment has been described. However, it should be noted that the alternate embodiments can be practiced otherwise than as specifically illustrated and described.

The invention claimed is:

1. A method for controlling torque converter lockup clutch during a vehicle deceleration coasting event, comprising:
   (a) producing negative slip across the clutch by reducing the clutch's torque capacity;
   (b) decreasing the magnitude of said slip by increasing said torque capacity; and
   (c) maintaining slip across the clutch.

2. The method of claim 1 wherein the method is executed when continuous slip across the clutch is desired.

3. The method of claim 1 wherein step (a) further comprises reducing the clutch's torque capacity along a ramp function.

4. The method of claim 1 wherein step (b) further comprises:
   producing a stepwise increase in the clutch's torque capacity; and
   increasing the clutch's torque capacity along a ramp following the stepwise increase in the clutch's torque capacity.

5. The method of claim 1 wherein step (b) further comprises:
   producing a stepwise increase in the clutch's torque capacity; and
   increasing the clutch's torque capacity along a ramp following the stepwise increase until the slip across the clutch decreases.

6. The method of claim 1 wherein step (c) further comprises:
   producing a stepwise decrease in the clutch's torque capacity; and
   maintaining slip constant across the clutch at a desired magnitude.

7. A method for controlling a torque converter lockup clutch that is engaged when a vehicle deceleration coasting event occurs, comprising:
   (a) producing slip across the clutch by reducing the clutch's torque capacity;
   (b) promptly producing a magnitude decrease in said slip by increasing said torque capacity; and
   (c) maintaining continuous negative slip across the clutch.

8. The method of claim 7 wherein step (a) further comprises reducing the clutch's torque capacity along a linear ramp function.

9. The method of claim 7 wherein step (b) further comprises:
   producing a stepwise increase in the clutch's torque capacity; and
   decreasing the clutch's torque capacity along a ramp following the stepwise increase in the clutch's torque capacity.

10. The method of claim 7 wherein step (b) further comprises:
    producing a stepwise increase in the clutch's torque capacity; and
    increasing the clutch's torque capacity along a ramp following the stepwise increase until the slip across the clutch decreases.

11. The method of claim 7 wherein step (c) further comprises:
  producing a stepwise decrease in the clutch's torque capacity; and
  maintaining slip constant across the clutch at a desired magnitude.

12. A method for controlling torque converter lockup clutch that is engaged when a deceleration coasting event occurs, comprising:
  (a) producing negative slip across the clutch by reducing the clutch's torque capacity along a ramp function;
  (b) promptly producing a stepwise increase in the clutch's torque capacity;
  (c) decreasing the clutch's torque capacity along a ramp following the stepwise increase in the clutch's torque capacity; and
  (d) maintaining continuous negative slip across the clutch.

13. The method of claim 12 wherein steps (c) and (d) further comprise:
  producing a stepwise decrease in the clutch's torque capacity; and
  maintaining slip constant across the clutch at a desired magnitude.

\* \* \* \* \*